CONTROL OF REMOTE CONCENTRATOR TELEPHONE EQUIPMENTS

Filed April 8, 1964 2 Sheets-Sheet 1

Jan. 30, 1968 A. J. HENQUET ETAL 3,366,740

CONTROL OF REMOTE CONCENTRATOR TELEPHONE EQUIPMENTS

Filed April 8, 1964 2 Sheets-Sheet 2

United States Patent Office 3,366,740
Patented Jan. 30, 1968

3,366,740
CONTROL OF REMOTE CONCENTRATOR TELEPHONE EQUIPMENTS

Andre Jean Henquet, Boulogne, Robert Victor Cavin, Paris, and Marcel Feuillepain, Sainte-Genevieve-des-Bois, Seine-et-Oise, France, assignors to International Standard Electric Corporation, New York, N.Y., a corporation of Delaware Filed Apr. 8, 1964, Ser. No. 358,271
7 Claims. (Cl. 179—18)

ABSTRACT OF THE DISCLOSURE

Interface adapters are inserted between concentrator equipments and the ends of the trunks carrying the concentrated traffic. These adapters convert the local signals into tone signals which are transmitted over a special signal channel on the trunks. All other channels are used exclusively for voice transmission.

Figure 1:
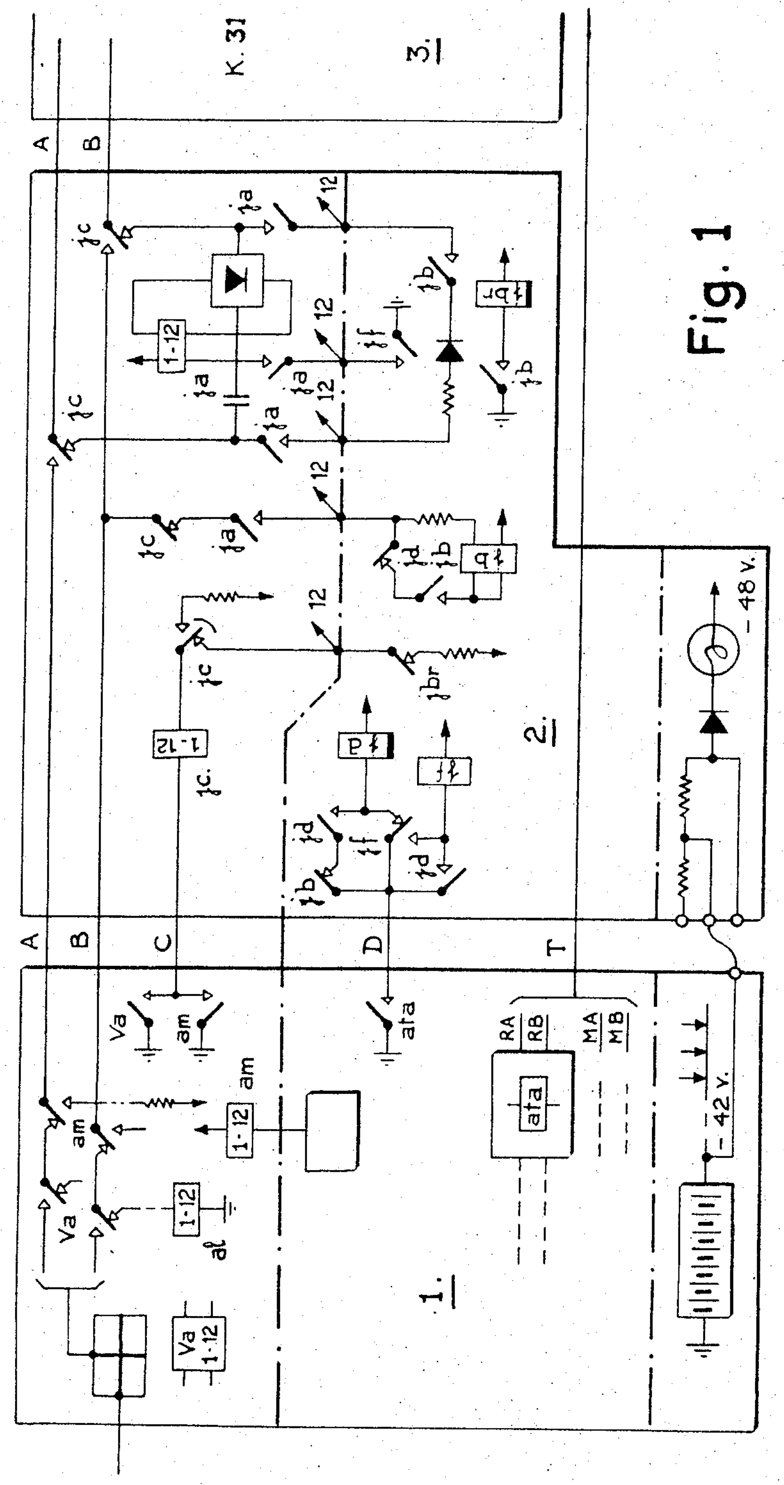

The present patent relates to the control systems of remote telephone and like equipments. These systems more particularly apply to the control of telephone line concentrators and provide means for controlling therein the release of a communication link by sending them a release order and the number of the trunk to be released through the same coded transmission means which were hitherto used for controlling the establishment of a connection by sending a call signal and the number of the calling or called line. Transmission systems comprising such means have been described in the following U.S. Patents 3,204,041; 2,944,115; in U.S. application S.N. 264,912, filed Mar. 13, 1963; and in a number of foreign patents.

One object of the present invention is to adapt the control system of the mentioned type to the case wherein the exchange is linked to the remote concentrators through a multiplex link such as the carrier multiplex system designated "K.31" by the well known firm ITT Telecommunications. French Patent No. 1,162,638, described means which allow the coded transmission system to be adapted to the case of a carrier multiplex link of the kind wherein the terminal equipments comprise, for each path connected to the multiplex, besides the conversation pair, a signalling pair ("TRON" and "RON" wires). The coded transmission was carried out therein through two channels of the multiplex, which were alloted to it besides the communication channels. However, the signalling means over the channels of a multiplex of the type considered herein, such as a K.31 multiplex, are more restricted, as the terminal equipment for each path is therein reduced to the conversation pair.

The present invention provides a system wherein two pairs of wires of the remote link, which are not equipped as a multiplex, are alloted to the coded transmission such as provided in the case of a wire link, whereas the channels of the multiplex, carried by one or two pairs of wires, are allotted to the conversation trunks. The terms "two pairs" and "one or two pairs" obviously are not restrictive, as the multiplex can use, when required, more than two pairs, and the coded transmission can use only one, as mentioned above. Adapter equipments are inserted between the concentrators and the terminal equipments of the multiplex and comprise means for cooperating with the concentrators in the same manner as these would directly cooperate with one another, and means for exchanging between themselves sufficient control and check signals, in the way admitted by the multiplex terminal equipments which transmit these signals.

The way of signalling admitted by the existing equipments comprises (1) in the direction from the exchange to remote concentrator, the connection of a feeding bridge (grounded wire A and battery wire B) and the transmission of an industrial frequency current (for instance 50 Hz.); and (2) in the direction from the remote concentrator to the exchange, the connection of a loop A–B. Therefore, according to the present invention, adaptors (1) replace various sending signals (such as positive or negative, weak or strong batteries, on one wire or the other) by sending simpler signals, and (2) group operation steps in the concentrators in order to signal operation stages that will be less numerous than the several operation steps.

The normal step-by-step process of the concentrators is secured by co-operation means provided in the associated adaptors, whereas the reciprocal stepping of the adaptors is secured stage after stage, each stage comprising one or several steps of the concentrators.

According to another feature of the invention, the stepping of the adaptors after certain stages which are not signalled thereto is secured by slow relays provided therein and the operating (or the release) time of which covers the duration of the stage with a suitable overstep.

The present invention therefore provides adaptors which comprise means for cooperating, each one with the associated concentrator, in a detailed manner, and by means of relatively numerous and varied signals, such as provided in the concentrator system; means for cooperating one with the other, by means of a multiplex of the mentioned type, in a less detailed manner, and by means of less numerous and varied signals, provided in the multiplex system; and timing means, such as slow relays, to secure the automatic stepping of an adaptor, namely after an operating stage, the end of which has not been signalled to it, the delay of said timing means covering the duration of such a stage with a suitable overstep.

According to a peculiar feature of the invention, the first operating steps in the terminal concentrator in a connecting operation, namely the application of a low battery for checking the condition of the remote concentrator, the operation of a first relay on said battery, and the operation of a second relay which applies a strong battery which signals the connecting order, are grouped into one stage through which the terminal concentrator cooperates with its adaptor and after which the latter transmits a signal to the remote adaptor which then cooperates in the same detailed way with the remote concentrator. According to another feature, this first signal is given by sending the industrial frequency to the remote adaptor, whereas all the further signals will be transmitted from one adaptor to the other, by connecting the feeding bridge (exchange side) and by connecting the loop or an equivalent false loop (remote side), as mentioned above.

According to another feature of the invention, a slow relay is provided in the remote adaptor to secure its automatic stepping after the operating stage that will follow, namely, the transmission and the reception of a loop which signals to the central concentrator the correct condition of the remote concentrator, and the stop of the industrial frequency signal (which stop will have no signal action in the remote adaptor); said slow relay controlling by itself the connection of the trunk in the remote concentrator.

Other features and advantages of the invention will appear from the following description of an embodiment and with referencee to the accompanying drawings, wherein:

FIGURE 1 represents the remote portion of the system, and

Figure 2:
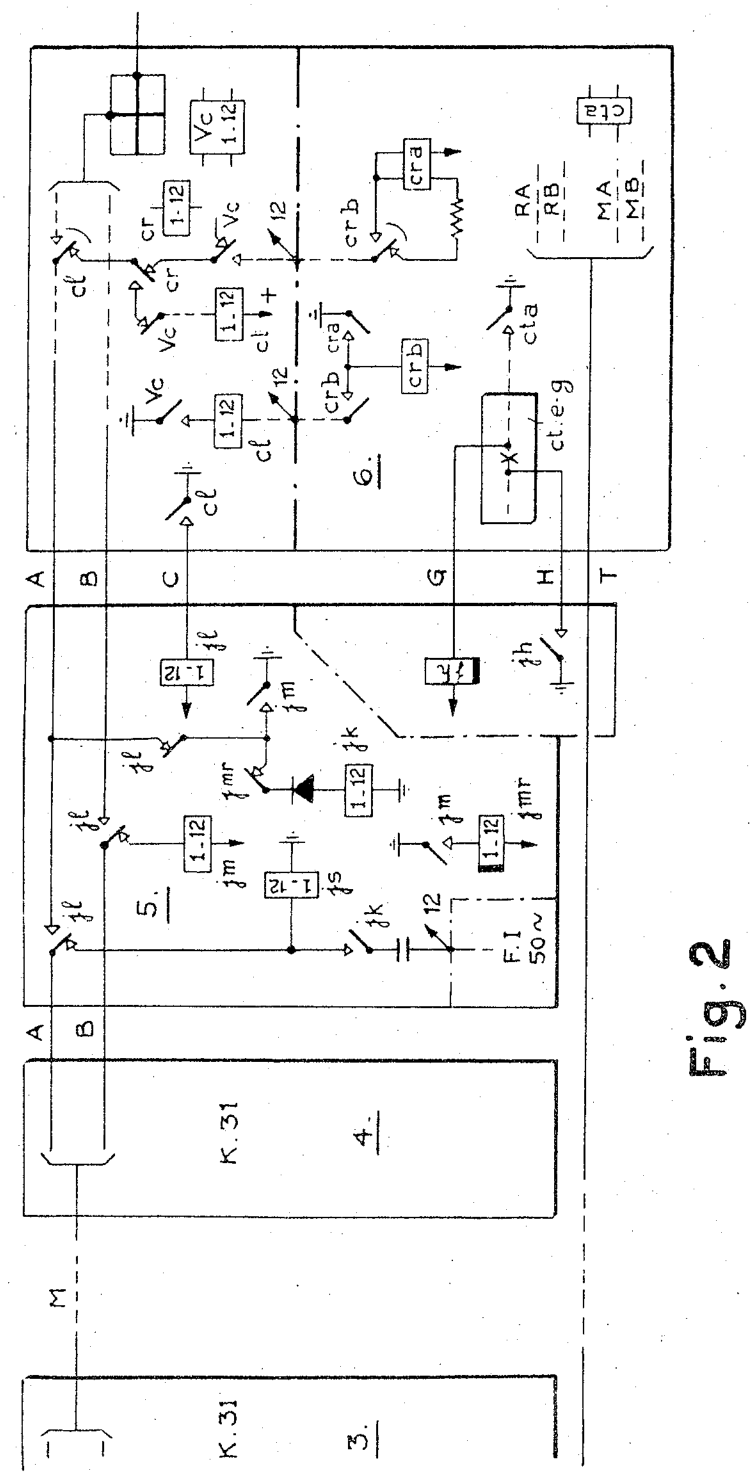

FIGURE 2 the portion located at the central exchange.

In the specification which follows, a relay and its contacts are designated by the same letters. However, the contacts carry a prefix letter "*m*" or "*b*", depending upon whether they are "make" or "break" contacts, respectively.

*Brief description*

The invention provides a concentrator which is connected to a central telephone office via subscriber carrier equipment. In one exemplary embodiment of the invention, crossbar switches are located at the concentrator and at the central office. The crossbar switch at the concentrator has access to fifty-two different subscriber lines. The crossbar switch at the central office has access to fifty-two line circuits—each line circuit being individually associated with a corresponding subscriber line. Twelve channels in the subscriber carrier system provide channels between the two crossbar switches. Therefore, the problem is to operate the two crossbar switches whenever any subscriber is either calling or called, so that the subscriber station is connected over any idle one of the twelve channels to his own individual line circuit. Thereafter, the call is completed in the central office exactly as it would be completed if the subscriber station were connected directly to the line circuit instead of indirectly through the concentrator.

According to the invention, a separate signal channel is provided to enable the two crossbar switches to communicate with each other so that a line and its line circuit will be associated. Thus, for calling conditions, the crossbar switch at the concentrator acts somewhat as a line-finder to seize the calling line. For called conditions, the switch in the central office acts in a similar manner to seize the called line circuit. Either way, the operating switch sends suitable signals over the signal channel to set the switch at the other end so that it will complete the circuit between the appropriate subscriber line and its individually associated line circuit.

Signaling is completed between the central office and the concentrator via the trunk T. This trunk includes four wires RA, RB, MA, MB. Connected to the right-hand end of wires MA, MB, is the relay *cta* which operates responsive to contacts on the left-hand end of these same wires. Connected to the left-hand end of the wires RA, RB, is the relay *ata* which operates responsive to contacts on the right-hand end of these same two wires. Either way, the contacts are operated to transmit the subscriber number to the relay at the distant end. The operation of that relay sets the crossbar switch at that end.

After the line has been identified at each end, an idle channel is selected to carry the call between the office and the concentrator. This is done by applying a battery potential to the tip and ring conductors A and B of the trunk at the central office. Responsive thereto, a relay *jk* operates in the adapter to apply a 50 Hz. tone to the line A which leads to the K.31 carrier equipment 4. The carrier equipment transmits the tone in a corresponding channel to the K.31 carrier equipment 3 at the distant end of the multiplex line *m*. At the distant end, one of twelve relays *ja* operates to identify the channel having the tone on it.

The concentrators at two ends of the system have now exchanged the identity of the subscriber line (i.e. either relay *ata* has operated in a coded manner in the concentrator or relay *cta* has operated in a coded manner in the central office) and the channel has been selected for this call (i.e. one of twelve relays *jk* operated to send a 50 Hz. tone to one of twelve relays *ja* which operates). Responsive to this exchange, the crossbar switch controlling magnets $Va_{1-2}$ and $Vc_{1-12}$ operate to connect the subscriber line to its line circuit via the selected channel.

*Detailed description*

Referring to FIGURE 1, the remote portion comprises the remote concentrator 1, only the elements useful in the present specification having been represented; the adaptor 2 in accordance with the invention; and the terminal equipment 3 of a K.31 multiplex, shown in blank. Concentrator 1 is connected to its adaptor 2 by a certain number of pairs such as A–B constituting the conversation trunks, and by additional wires C and D. One wire C is added to each trunk A–B, whereas wire D is a common one. The coded transmission device of this concentrator is directly, and remotely, linked through the two pairs RA–RB and MA–MB constituting the transmission trunk T. Adaptor 2 is connected to equipment K.31 3 through trunks A–B, which are connected in that equipment to the channels of the multiplex M, FIGURE 2.

Referring to FIGURE 2, the central portion thereof comprises the other terminal equipment K.31 4, an adaptor 5 in accordance with the invention and a central concentrator 6 corresponding to the remote concentrator 1. This concentrator is connected to its adaptor 5 through pairs such as A–B which form the conversation trunks and through additional wires C, G and H, one wire C being added to each trunk A–B whereas wires G, H are common wires. The coded transmission device of this concentrator is directly linked to the other, as mentioned above, through the transmission trunk T comprising two pairs RA–RB and MA–MB. Adaptor 5 is connected to equipment K.31 4 through trunks A–B, which are, in that equipment, connected to the channels of multiplex M.

The detailed structure of the adaptors according to the invention, in their shown embodiment will be described hereinafter, along with operation of the whole.

The originating or terminating calls operate and are signalled from one end of the link to the other. As the concentrators are directly linked through the coded transmission trunk T, this operation proceeds outside the adaptors. During this operation, relay *cta* operates on pair MA–MB in the central concentrator, FIGURE 2. Through make contact *mcta*, a cascade of slow release relay *ct.e–g* is set in order to secure the correct operation at the end of a connection, wherein said cascade comprises relays *cte, ctf* and *ctg*. However, as the operation of equipments K.31 brings a certain delay, the release time of cascade *ct.e–g* is increased by the insertion of another slow relay *jh*, located in adaptor 5, at a suitable point of said cascade. Relay *jh* is set through wire G, and acts upon the following relays in the cascade through its make contact *jh* and wire H.

On the other hand, operation of relay *cta* controls the transmission of the number of the calling or called line. In the remote concentrator 1, FIGURE 1, relay *ata* operates over pair RA–RB from the beginning of this transmission and up to the end of the connection operation. A make contact *mata* added to this relay and connected to adaptor 2 through wire D, sets in said adaptor a pair of relays *jd–jf*. Relay *jd* is a slow release relay which is operated through a rest contact *bjf* and is locked on wire D through a rest contact *bjb* which will be open at a certain stage of the connection. Relay *jf* operates through a make contact *mjd* and is locked over wire D up to the end of the connection operation.

After the transmission of the number of the line, a free trunk circuit is engaged in the central concentrator, FIGURE 2, by the operation of the corresponding selector magnet Vc/1–12 of the crossbar switch. Make contacts *m*Vc apply to wires A–B a low battery through a common relay *cra* by the high resistance circuit of this relay. In adaptor 5, this battery is received by wire A over a relay *jk*/1–12 connected to the ground and which does not operate. The battery wire B is ineffective for controlling the adaptor. In the concentrator, relay *cra* operates through relay *jk*. The circuit including relays *cra* and *jk* may be traced as follows, battery B, the two windings of relay *cra* in series, resistor R1, contacts *b–crb, m–*Vc, *b–cr, b–cl*, wire A, contacts *b–jl* in adaptor 5, contacts *b–jmr*, diode D1, and the winding of relay *jk* to ground. Relay *cra* actuates a a common relay *mcrb*. A change-over contact *crb* switches on the low resistance circuit of relay *cra*, thus applying a strong battery to wires A–B. (i.e. resistor R1 is bypassed). In the adaptor, relay *jk* operates on this strong battery and applies through contact *m–jk*, the industrial frequency current (50 Hz.) to wire A towards equipment K.31 4. It will be understood that relay *jk* cooperates in this case with the central concentrator as the connection relay *al*/1–12 would do in the remote concentrator 1, FIGURE 1. The industrial frequency signal (50 Hz.) operates relay *al* as the strong battery A–B connected through the low resistance circuit of relay *cra* operates relay *jk*.

The 50 Hz. signal is suitably transmitted by equipment 4 to equipment 3 and then to remote adaptor 2, FIGURE 1. In the condition of the circuit of this adaptor, a condensed concentrator loop is connected to wires A–B, equipment K.31 side. In this loop, relay *ja*/1–12 is connected in a rectifier bridge. This relay operates on the 50 Hz. signal and locks itself through another winding on a make contact of relay *jf* up to the end of the connection operation. Relay *ja* connects a battery to wire B through the high resistance circuit of a common relay *jb*. This relay replaces the common relay *cra* of concentrator 6, FIGURE 2, in the co-operation with concentrator 1, FIGURE 1. In the latter, the battery wire B is received on a ground through connecting relay *al*, which does not operate, whereas relay *jb* operates through relay *al*. Relay *jb* connects a D.C. loop in parallel with the condensed loop on wires A–B towards equipment K.31. Moreover, it disconnects slow relay *jd*, the release delay of which will cover the operation steps that will follow. Finally, relay *jb* sets a slow release relay *jbr*, which will prevent the untimely operation of relay *jc*/1–12.

In the central adaptor 5, FIGURE 2, the D.C. loop actuates a relay *jm*/1–12 which is held out on wire B and which is, on the other hand, connected to the battery, while an inductance *js*/1–12 is connected at the same time between wire A and the ground, this constituting a supply bridge A–B. Relay *jm*, through a make contact, adds another ground on wire A towards the concentrator and actuates a relay *jmr*/1–12, the slow release of which will cover some operating steps. A break contact of relay *jmr* disconnects relay *jk* from wire A without acting on common relay *cra* in the concentrator. Relay *jk* restores, having been short-ciruited by contact *m–jm*, then cut off by contact *r–jmr*. The break of contact *t–jk* cuts off the 50 Hz. signal from wire A. In the remote adaptor 2, FIGURE 1, the stopping of the 50 Hz. signal transmitted by equipment K.31 is ineffective, as the receiving relay *ja* is locked on *t–jf*.

After this operating stage, slow relay *jd* releases. Contact *b–jd* connects relay *jb* through its low resistance circuit and to wire B. In the remote concentrator, the strong battery thus applied to wire B operates the connecting relay *al*, which causes the connection of the trunk by operating the electromagnet V*a*/1–12 of the corresponding selector in the crossbar switch. A ground is applied to wire C by make contact *m*V*a*, but this ground is ineffective at the moment on relay *jc*, since the connection of this relay to the battery is cut off by a break contact of relay *jbr* which is operated.

The operation of selector V*a* extends the trunk in the remote concentrator and disconnects relay *al*. The disconnection of this relay from wire B causes relay *jb* to restore in adaptor 2. Contact *m–jb* opens in the D.C. loop, which stops the transmission thereof towards the central equipment. Slow relay *jbr* is cut off and its release period will cover the operating steps which will follow.

In the central adaptor 5, FIGURE 2, the end of the D.C. loop causes relay *jm* to release. The application of ground at wire A towards the central concentrator is cut off by contact *m–jm* which is now open. Relay *jmr* is cut off to cover the further operating steps. In the central concentrator 6, relay *cra* restores due to the fact that it finds no longer a ground on wire A, then relay *cl*/1–12 operates. Make contacts of this relay extend the trunk in the central concentrator. An additional contact *m–cl* provided for the adaptation applies a ground to wire C. The corresponding relay *jl*/1–12 operates on said ground in the adaptor. Make contacts of this relay extend the trunk in adaptor 5. Thereupon, the slow relay *jmr* restores, connecting again relay *jk* to a wire that the operation of relay *jl* has just cut-off from wire A.

In the remote adaptor 2, FIGURE 1, the slow relay *jbr* releases, causing the above mentioned operating steps. Contact *b–jbr* connects a battery at the back of relay *jc* which operates locks between an independent battery and the ground applied to wire C through contact *m*–V*a* in the remote concentrator. Contacts *t–jc* extend the trunk in the remote adaptor. In an originating call, the loop of the calling subscriber is now transmitted to the central exchange through the trunk which is extended in the two concentrators and the two adaptors. In a terminating call, the called subscriber receives the ringing from the central exchange. When he responds and removes his hand set from its hookswitch a D.C. loop is completed to the central exchange.

Last operating steps now occur in the central concentrator 5, FIGURE 2. Relay *cta* restores, causing the slow release of the cascade *ct.e–g*, including relay *jh* located in the adaptor while electrically inserted in this cascade. The transmission trunk T is freed. Only relay *jl* remains operated in the central adaptor.

The release of the transmission trunk in the central concentrator causes relay *ata* to fall back in the remote concentrator 1, FIGURE 1. Contact *m–ata*, returned in rest condition, cuts off the ground at wire D and causes relay *jf* to restore in the adaptor. Only relay *jc* remains operated in the adaptor, held on wire C by the selector V*a* of this trunk, which selector remains in the operated condition.

The process which takes place in the release of a connection will be now described. The hanging up by the two subscribers is noted in the exchange, causing the disconnection of the trunk in the central concentrator 6, FIGURE 2. Selector V*c* restores and causes the corresponding relay *cl* to release. The release of relay *cl* cuts off the ground wire C and releases relay *jl* in adaptor 5 which is thus restored in the rest condition. On the other hand, the release of relay *cl* establishes a release call from the central concentrator towards the remote concentrator through the transmission trunk T. The relay *cta* operates and sets again the slow release cascade (which is reduced by the elimination of slow relays *cte* and *ctf*).

In the remote concentrator, relay *ata* operates, then the coded transmission of the number of the trunk to be released is effected and causes the selection of said trunk in the two concentrators. In the remote concentrator, the release relay *am*/1–12 operates and causes the corresponding selector V*a* to restore. A contact *m–am* applies a second ground to wire C before the first ground is cut-off at contact *m*–V*a*. Relay *jc* will thus still be held in the adaptor, and the trunk remains extended therein through make contacts of this relay. Other contacts *m–am* apply a battery to wires A and B which still reach equipment K.31 3. The application of battery to wire B is ineffective. The application of the battery to wire A forms a false loop AB to which equipment K.31 responds as to a loop and which causes a loop signal to be transmitted towards the exchange.

In the central adaptor, FIGURE 2, relay *jm* operates on this loop and applies the ground to wire A towards the central concentrator. On the other hand, relay *jm* operates the slow relay *jmr*. In the central concentrator, the control relay *ct* which is connected to a positive battery, operates on the grounded wire A and proceeds to release the trunk circuit. Thereafter, the slow release cascade reaches to release, covering the preceding steps. Relay *cta* is cut off and causes relay *ata* to restore in the remote concentrator, FIGURE 1.

The restoring of relay *ata* restores the release relay *am* which stops the false loop towards equipment K.31 3. The latter stops the transmission of the loop signal towards the central equipment. Restored relay *ata* cuts the ground from wire C, and relay *jc* restores in the remote adaptor, which thus comes back to rest condition.

In the central adaptor, FIGURE 2, the end of the loop causes relay *jm* to restore. This relay suppresses the ground from wire A towards the concentrator, as relay *jk* has been cut off during the slow release of relay *jmr*. In the central concentrator, relay *ct* restores, completing the release of the trunk circuit.

While the principles of the invention have been described above in connection with specific embodiments, it is to be clearly understood that this description is made only by way of example and not as a limitation on the scope of the invention.

We claim:

1. A telephone system comprising a central telephone office and a remote concentrator interconnected by carrier channels, one of said channels being devoted to signaling and the other of said channels being for voice transmission, a plurality of subscriber lines at said concentrator, a plurality of line circuits at said central office, each of said line circuits being individually associated with a corresponding one of said lines, automatic switching equipment at said central office for extending connections to and from said line circuits, and means responsive to signals sent over said signal channels for interconnecting a line and its individually associated line circuit whereby connections may be completed via said switching equipment.

2. The telephone system of claim 1 and means for transmitting tone signals over an idle one of said carrier channels for selectively operating equipment in said office and said concentrator for connecting said line and its line circuit via said idle channel.

3. The system of claim 2 and means in said adapter for conducting supervisory tests before signaling the identified subscriber line.

4. The system of claim 2 and means comprising slow responding devices for precluding the signaling to certain operational stages.

5. The system of claim 2 wherein certain of said line circuits are grouped into switching stages, and means responsive to the scanning of a stage for signaling the adapter means at said remote concentrator to operate the switch thereat.

6. The system of claim 5 and means comprising slow responding relay means for operating said switches over said stages.

7. The system of claim 2 wherein the central office and remote concentrator switches operate responsive to battery and reverse battery signals, and means for converting between said battery and reverse battery signals and said tone signals.

References Cited

UNITED STATES PATENTS

| | | | |
|---|---|---|---|
| 3,073,906 | 1/1963 | Lee | 179—18.30 |
| 3,173,996 | 3/1965 | Rypinski | 325—55 X |
| 3,267,379 | 8/1966 | Bloxsom | 325—55 |

FOREIGN PATENTS

| | | |
|---|---|---|
| 792,664 | 4/1958 | Great Britain. |

KATHLEEN H. CLAFFY, *Primary Examiner.*

L. A. WRIGHT, *Assistant Examiner.*